(12) United States Patent
Enger et al.

(10) Patent No.: US 12,034,244 B2
(45) Date of Patent: Jul. 9, 2024

(54) BATTERY CONNECTOR LOCKOUT DEVICE

(71) Applicant: Brady Worldwide, Inc., Milwaukee, WI (US)

(72) Inventors: Andrew N. Enger, Muskego, WI (US); Alexis D. Morales, Chino Hills, CA (US)

(73) Assignee: Brady Worldwide, Inc., Milwaukee, WI (US)

( * ) Notice: Subject to any disclaimer, the term of this patent is extended or adjusted under 35 U.S.C. 154(b) by 187 days.

(21) Appl. No.: 17/426,584

(22) PCT Filed: Jan. 24, 2020

(86) PCT No.: PCT/US2020/015028
§ 371 (c)(1),
(2) Date: Jul. 28, 2021

(87) PCT Pub. No.: WO2020/159826
PCT Pub. Date: Aug. 6, 2020

(65) Prior Publication Data
US 2022/0102900 A1 Mar. 31, 2022

Related U.S. Application Data

(60) Provisional application No. 62/798,266, filed on Jan. 29, 2019.

(51) Int. Cl.
*H01R 13/44* (2006.01)
*H01M 50/574* (2021.01)
(Continued)

(52) U.S. Cl.
CPC .......... *H01R 13/44* (2013.01); *H01M 50/574* (2021.01); *H01M 50/588* (2021.01); *H01R 13/60* (2013.01); *H01R 13/639* (2013.01)

(58) Field of Classification Search
CPC ................ H01R 13/44; H01R 13/5829; H01R 13/5833; H01R 13/60; H01R 13/639; H01R 13/6392; H01M 50/574; H01M 50/588
See application file for complete search history.

(56) References Cited

U.S. PATENT DOCUMENTS 3,183,302 A * 5/1965 Wochner .................. H01R 4/20
174/92
4,063,110 A * 12/1977 Glick ................. H01R 13/6397
174/67
(Continued)

FOREIGN PATENT DOCUMENTS

| EP | 0534646 A2 | 3/1993 |
| GB | 2527585 A | 12/2015 |
| JP | 2003297313 A | 10/2003 |

OTHER PUBLICATIONS

European Patent Office, Extended Search Report, Application No. 20748380.1, dated Sep. 21, 2022, 11 pages.
(Continued)

*Primary Examiner* — Thanh Tam T Le
(74) *Attorney, Agent, or Firm* — Quarles & Brady LLP

(57) ABSTRACT

A battery connector lockout device is configured to lockout a battery connector including a connector head connected to a wire. The device includes an enclosure body having a first base wall and a second base wall opposite one another that are selectively movable in relative to one another between an open and closed positions. A cavity is defined by the enclosure body and dimensioned to receive the connector head and a wire access opening extends through the enclosure body into the cavity. A peg projects into the cavity from the enclosure body. A locking mechanism is configured to be selectively locked to hold the first base wall and the second base wall in the closed position thereby retaining the connector head in the cavity (that is, locking out the battery (Continued)

connector in the lockout device so that the connector head cannot be used).

18 Claims, 8 Drawing Sheets

(51) Int. Cl.
*H01M 50/588* (2021.01)
*H01R 13/60* (2006.01)
*H01R 13/639* (2006.01)

(56) References Cited

U.S. PATENT DOCUMENTS

| | | | | |
|---|---|---|---|---|
| 4,488,764 | A | 12/1984 | Pfenning et al. | |
| 4,592,607 | A * | 6/1986 | Pejovic | H01R 13/60 |
| | | | | 439/142 |
| 4,593,541 | A * | 6/1986 | Hollis | H01R 13/6395 |
| | | | | 174/67 |
| 4,643,505 | A * | 2/1987 | House | H01R 13/6392 |
| | | | | 439/267 |
| 4,674,303 | A * | 6/1987 | Salcone, II | A44B 11/2576 |
| | | | | 220/210 |
| 4,749,363 | A * | 6/1988 | Luska | H01R 13/44 |
| | | | | 439/367 |
| 4,865,557 | A * | 9/1989 | Kershaw | H01R 13/60 |
| | | | | 439/367 |
| 4,972,167 | A * | 11/1990 | Fujioka | H01F 27/33 |
| | | | | 336/212 |
| 5,045,640 | A * | 9/1991 | Riceman | H01R 13/447 |
| | | | | 174/67 |
| 5,052,939 | A * | 10/1991 | Koch | H01R 13/6397 |
| | | | | 439/304 |
| 5,061,194 | A | 10/1991 | Herman et al. | |
| 5,139,429 | A | 8/1992 | Herman et al. | |
| 5,191,172 | A * | 3/1993 | Garganese | H02G 15/043 |
| | | | | 174/74 A |
| 5,259,782 | A * | 11/1993 | Giffin | H01R 13/6392 |
| | | | | 439/367 |
| 5,397,859 | A * | 3/1995 | Robertson | H02G 15/113 |
| | | | | 174/92 |
| 5,594,210 | A | 1/1997 | Yabe | |
| 5,684,274 | A * | 11/1997 | McLeod | H01R 4/70 |
| | | | | 174/92 |
| 5,755,588 | A * | 5/1998 | Sweatman | H01R 13/6392 |
| | | | | 439/369 |
| 6,085,671 | A * | 7/2000 | Kerr | E05G 1/005 |
| | | | | 109/51 |
| 6,149,445 | A | 11/2000 | Daddono | |
| 6,280,235 | B1 * | 8/2001 | Radliff | H01R 13/501 |
| | | | | 439/456 |
| 6,454,576 | B1 * | 9/2002 | Hedrick | H01R 13/5812 |
| | | | | 439/369 |
| 7,273,984 | B2 | 9/2007 | Murphy | |
| 7,384,297 | B2 * | 6/2008 | King, Jr. | H02G 15/007 |
| | | | | 439/369 |
| 7,425,146 | B2 * | 9/2008 | Valentin | H01R 13/6397 |
| | | | | 439/304 |
| 8,272,670 | B2 * | 9/2012 | Krug, Jr. | F16L 59/024 |
| | | | | 285/45 |
| 10,164,416 | B2 * | 12/2018 | Nooner | H02G 15/10 |
| 10,490,993 | B2 * | 11/2019 | Stoll | F16L 57/00 |
| 10,658,786 | B2 * | 5/2020 | Refai | H01R 13/5202 |
| 10,784,627 | B1 * | 9/2020 | Baxter | H01R 24/30 |
| 10,840,615 | B2 * | 11/2020 | Newman | H01R 13/5216 |
| 11,183,795 | B2 * | 11/2021 | Pearman | H01R 13/6397 |
| 2016/0156112 | A1 | 6/2016 | Broughton et al. | |

OTHER PUBLICATIONS

PCT International Search Report and Written Opinion, PCT/US2020/015028, dated Apr. 28, 2020, 12 pages.

* cited by examiner

BATTERY CONNECTOR LOCKOUT DEVICE

CROSS-REFERENCE TO RELATED APPLICATIONS

This application represents the U.S. national stage entry of International Application No. PCT/US2020/015028 filed Jan. 24, 2020, which claims the benefit of U.S. Provisional Application No. 62/798,266 filed Jan. 29, 2019. The contents of that application are hereby incorporated by reference for all purposes as if set forth in their entirety herein.

FIELD OF INVENTION

This disclosure relates to lockout devices and, in particular, to lockout devices for use with battery connectors.

BACKGROUND

When maintaining or repairing equipment, workers often utilize lockout devices to isolate and secure one or more energy control points. Energy control points of concern are shut off, de-energized, or otherwise placed in a safe configuration and lockout devices are placed on the energy control points in order to prevent those energy control points from being turned back on, re-energized, or otherwise returned to an operational state while the equipment is being worked upon. After all the work is done, the lockout devices are removed and the energy isolation points can be returned to on, energized, or operational states.

SUMMARY

Many industrial and consumer vehicles, as well as other electrical devices, utilize wired battery connectors to link the battery terminals of a battery to said vehicle or device. Battery connectors come in a range of styles and can include a variety of different features. For example, some battery connectors include connector heads with openings configured to engage a battery terminal.

In some applications, batteries have included terminal covers configured to prevent incidental closing of the circuit between battery terminals, which may cause accidental battery discharge. Terminal covers, however do not provide any substantial safeguard against unintentional or unauthorized reconnection of the connectors onto the terminals of the battery.

Disclosed herein is a battery connector lockout device configured for use in locking out a wide variety of different battery connector configurations. In some forms, the lockout device utilizes an internal peg to engage an opening formed in a connector head, in combination with an enclosure body, in order to restrict access to a battery connector. Use of the peg enables the lockout device to retain connector heads which might have the same or a similar thickness than the wire they are attached to and, therefore, might otherwise be able to slide out of the enclosure through the wire access opening of the enclosure. Further, a battery connector lockout device may be implemented with a folding peg, a plurality of wire access openings, and other features in order to accommodate a wide variety of different connector head styles including those with multiple wires emanating from the connector, but no opening in the connector to secure the connector in the enclosure body.

According to one aspect, a battery connector lockout device is configured to lockout a battery connector with a connector head connected to a wire. The battery connector lockout device includes an enclosure body with a first base wall and a second base wall opposite the first base wall. The first base wall and the second base wall are selectively movable relative to each other between an open position and a closed position. The battery connector lockout device also includes a cavity defined by the enclosure body and dimensioned to receive the connector head, a wire access opening extending through the enclosure body into the cavity and dimensioned to permit extension of the wire from an exterior of the lockout device into the cavity while the first base wall and the second base wall are in the closed position, and a peg projecting into the cavity from the enclosure body. The battery connector lockout device also notably includes a locking mechanism that is configured to be selectively locked to hold the first base wall and the second base wall in the closed position which can thereby retain a connector head received in the cavity therein so that it cannot be used until the lock is removed.

In some forms, the head of the battery connector may include an attachment opening defined by the connector head and the peg may be configured to engage the attachment opening on the connector head. However, in other forms, the battery connector may include two or more wires coming from the connector head and the peg may be received between the two or more wires such that the two or more wires straddle the peg, thereby restricting the connector head from being withdrawn from the wire access opening when the connector head is received in the cavity of the enclosure body and the first and second base walls are placed in the closed position.

In some forms, the peg may project outwardly from the first base wall. Such a battery connector lockout device may also include a receiving slot positioned opposite the peg on the second base wall and the peg may be configured to engage the receiving slot when the first base wall and the second base wall are in the closed position. The receiving slot may project outwardly from the second base wall into the cavity and may have an elongated profile that is configured to receive the peg as the first base wall and the second base wall move from the open position to the closed position.

In some forms, the enclosure body may include a side wall extending from one or both of the first base wall and the second base wall. The side wall can be formed around the cavity to extend between the first base wall and the second base wall while in the closed position. Such a side wall may include a first wall section formed on the first base wall and a second wall section formed on the second base wall. However, in other designs, the side wall might be entirely on one of the two base walls.

In some forms, the side wall may include the wire access opening dimensioned to permit extension of the wire from the exterior of the lockout device into the cavity while the first base wall and the second base wall are in the closed position. The wire access opening may also be dimensioned to restrict passage of the connector head out of the cavity through the wire access opening. Further, the side wall may include at least one additional wire access opening formed through a different side of the enclosure body.

In some forms, the peg may be hingedly connected to the enclosure body such that the peg is selectively movable between an extended position in which the peg projects vertically outward into the cavity and a folded position in which the peg lies horizontally along the enclosure body.

In some forms, the first base wall may be hingedly connected to the second base wall, and the first base wall and the second base wall may be configured to rotate between the open position and the closed position.

In some forms, the locking mechanism may include a plurality of apertures configured to be selectively alignable and engaged by a lock to hold the first base wall and the second base wall in the closed position. In such a locking mechanism, a first one of the plurality of apertures may be integrally connected to the first base wall and a second one of the plurality of apertures may be integrally connected to the second base wall. Further, a tab may extend from one or both of the first base wall or the second base wall and the aperture(s) can be formed in the tab.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
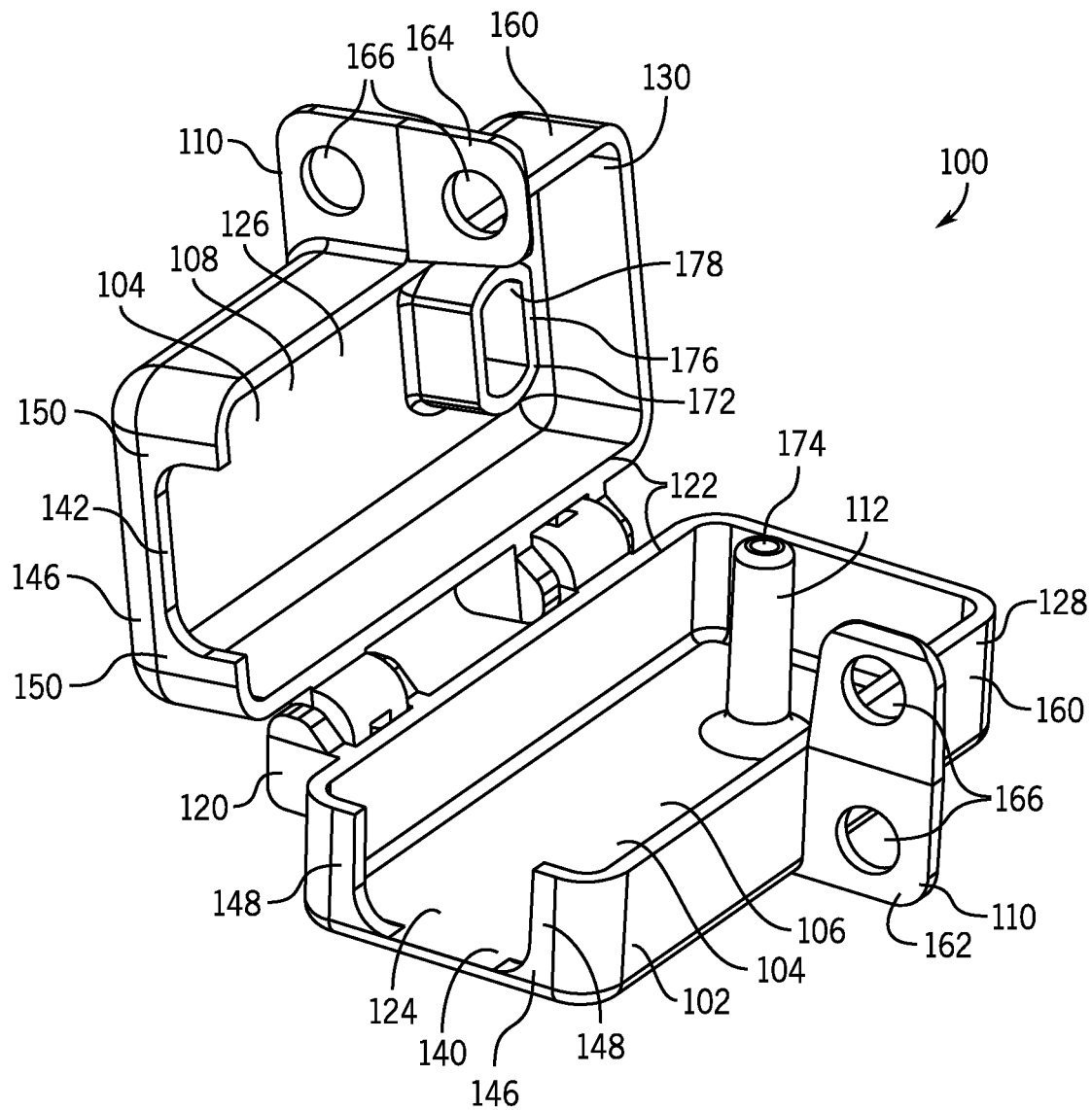
FIG. 1 is a perspective view of a battery connector lockout device according to a first embodiment in which the battery connector lockout device is in an open position without the connector yet received therein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
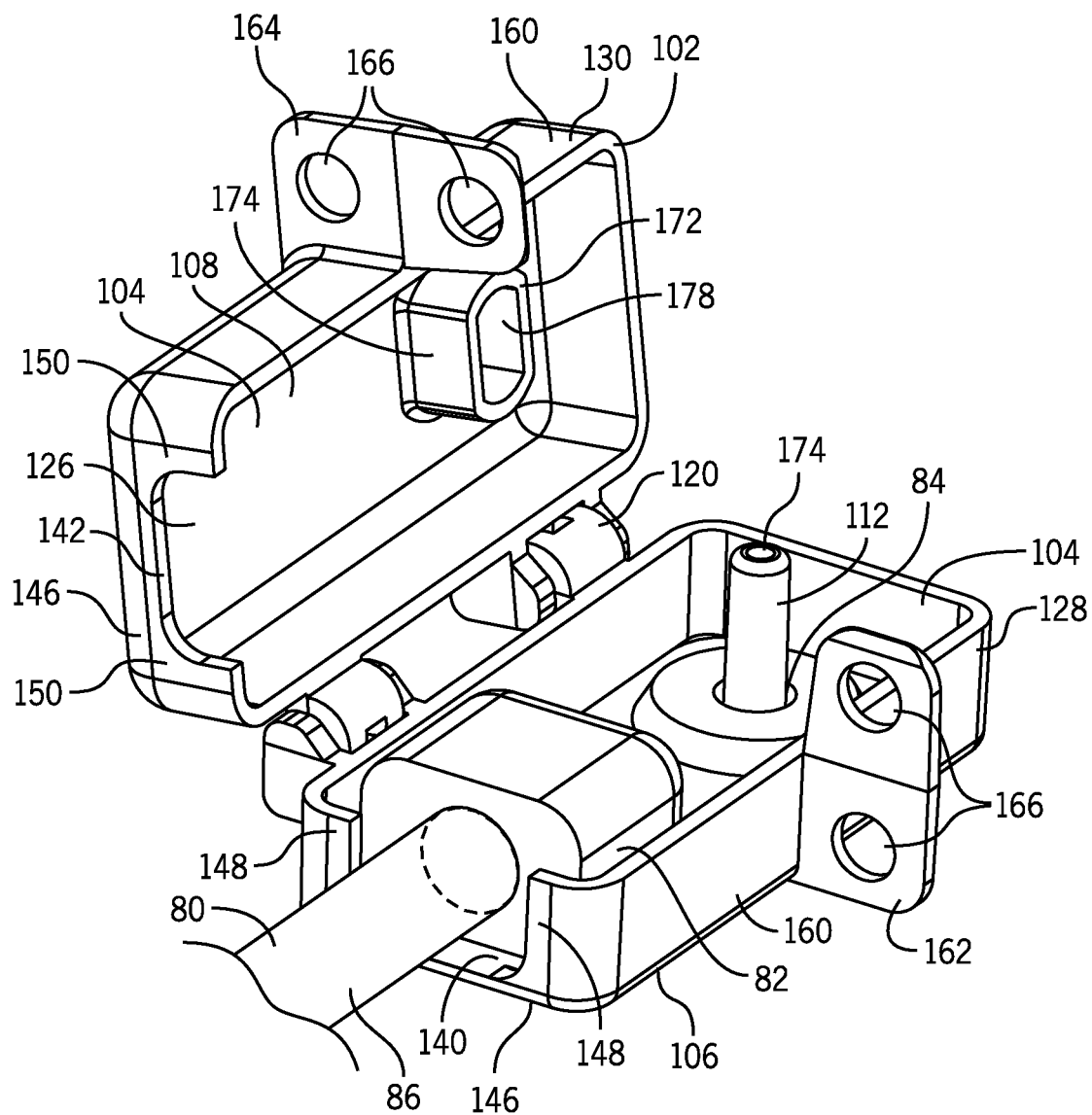
FIG. 2 is a perspective view of the battery connector lockout device of FIG. 1 with a battery connector received in a cavity and engaged by a peg.
Figure 3:
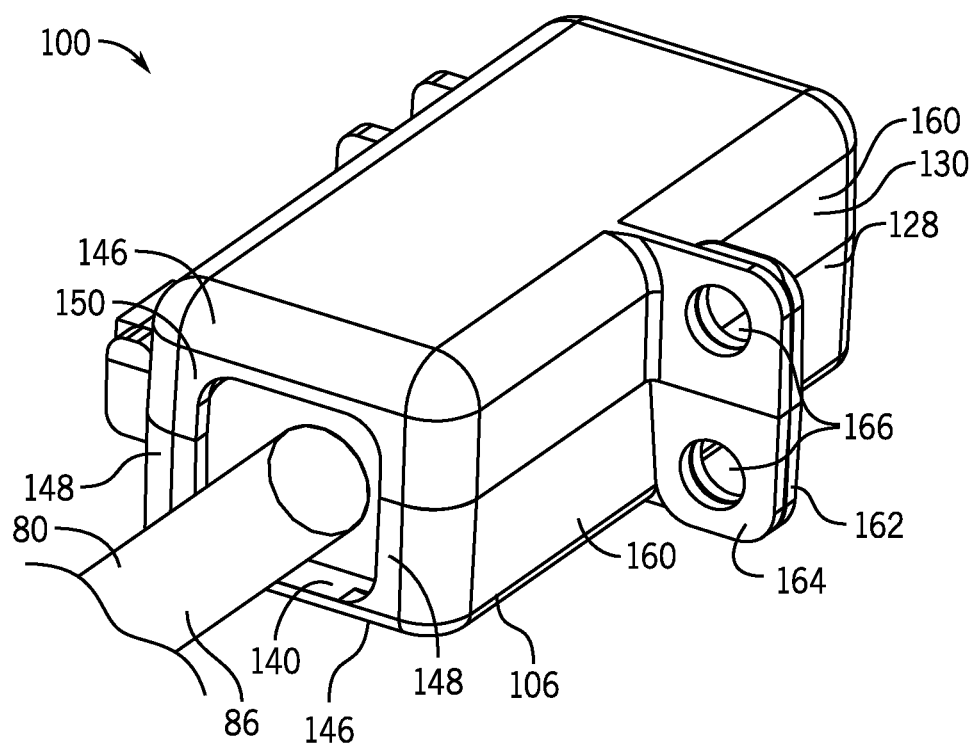
FIG. 3 is a perspective view of the battery connector lockout device of FIG. 1 in which the battery connector lockout device is in a closed position with the battery connector received in the cavity.

Referring first to FIGS. 1-3, a battery connector lockout device 100 configured to lock out a battery connector 80 is illustrated. The lockout device 100 includes an enclosure body 102 configured to receive the battery connector 80 in a cavity 104 between a first base wall 106 and a second base wall 108 (generally belonging to first and second portions, respectively, which also have peripheral sidewalls). The first base wall 106 and the second base wall 108 are selectively movable relative to each other between an open position (see, e.g., FIG. 1) and a closed position (see, e.g., FIG. 3). FIG. 1 illustrates the battery connector lockout device 100 in the open position without the connector 80 inside, while FIG. 2 shows the connector 80 received therein with the battery connector lockout device 100 in the open position and FIG. 3 shows the connector 80 received therein with the battery connector lockout device 100 in the closed position.

In the open position, the first and second base walls 106, 108 are separated from each other, providing access to the cavity 104 and permitting the connector head 82 of the battery connector 80 to be received therein. When moved into the closed position, the first base wall 106 and the second base wall 108 move together and block the removal of the connector head from the cavity. A locking mechanism 110 can then be used with a lock (not shown) to hold the first and second base walls 106, 108 in the closed position, thereby retaining the connector head 82 in the enclosure body 102.

The lockout device 100 also includes a peg 112 that projects into the cavity 104 from the first base wall 106 towards the second base wall 108 when in the closed position. The peg 112 is configured to engage an attachment opening 84 formed in the connector head 82 as the connector head 82 is inserted in the cavity 104. When the lockout device 100 is in the closed position, this peg 112 retains the battery connector 80 in the enclosure body 102.

With continued reference to FIGS. 1-3 and having discussed the lockout device 100 generally, details of its structure will now be described. The first and second base walls 106, 108 both have planar bodies with a generally rectangular shape corresponding to the profile of the cavity 104. However, in some embodiments, the shape and size of at least one of the base walls may be different than the one other base wall or the base walls may have a shape that differs from the shape illustrated.

A hinge 120 is positioned on an attachment side 122 of portions of the enclosure body 102 and has hinge sections on one of the peripheral sides of each of the first and second base walls 106, 108. This hinge 120 rotatably couples the base walls 106, 108 to one another so that they can rotate between the open and closed positions. In other embodiments, the base walls could be linked with alternative methods of rotational or movable attachment to achieve similar effect with respect to opening and closing. For example, some enclosure body designs could include base walls which slide between open and closed positions or which are entirely detachable from each other but which are still securable in at least one closed or locked position.

When in the closed position, an interior face 124 of the first base wall 106 is oriented parallel and opposite to an interior face 126 of the second base wall 108. The hinge 120 spatially separates the first and second base walls 106, 108 so that the interior faces 124, 126 define the two opposing boundaries of the cavity 104. In the embodiment illustrated, the enclosure body 102 further includes side walls 128, 130 which project outward from each of the interior faces 124, 126 and extend towards the opposite one of the base walls 106, 108. The side walls are formed around the peripheries of the first and second base walls 106, 108 and, therefore, are also formed around and define the peripheral boundaries of the cavity 104. In the particular embodiment illustrated, the side walls 128, 130 meet midway between the first and second base walls 106, 108 in the closed configuration to form a generally continuous wall (except for the openings 140, 142 that will be described below) between the base walls 106, 108.

In some embodiments, a portion of at least one of the side walls can be different than at least one other portion of that side wall, or at least one portion of the other side wall. For example, at least one portion of a side wall may be slanted or have a variable height that may or may not correspond to at least one portion of the other side wall. Further, at least one portion of the side walls may not meet to form a continuous wall, leaving a gap between opposite portions of the side walls. Other battery connector lockout devices may include only one side wall projecting from a single base wall all of the way or part of the way to the other base wall. Some embodiments can also omit at least a portion of at least one side wall. For example, an enclosure body may not have any side walls and can define a cavity between two base walls alone.

Notably, openings 140, 142 are formed through corresponding sections of the side walls 128, 130 to collectively form a wire access opening on a wire-receiving side 146 of the enclosure body 102. The openings 140, 142 are dimensioned to allow a wire or wires such as wire 86, which is coupled to the connector head 82, to extend through the side walls 128, 130 from the exterior of the enclosure body 102 into the cavity 104. As illustrated, the overall width of the wire access opening is less than the total length of the wire-receiving side 146, leaving partial side wall segments 148, 150 adjacent each of the openings 140, 142. Depending on the size of the connector head 82, these partial side wall segments 148, 150 may also help to prevent withdrawal of the connector head 82 from the lockout device 100 when the lockout device 100 is in the closed position.

In some embodiments of an enclosure body can also include additional opening into the cavity which may be on the same or a different side of the lock body as the first opening (see, e.g., FIGS. 4-8). An opening may be centered on a side of the enclosure body, or it may be offset in at least one of the horizontally or vertically directions. Further, some enclosure bodies, such as a lockout device with a gap between the side walls or that does not include side walls on a side of the enclosure body, may omit an opening altogether.

While in the open position, as illustrated in FIG. 1, the first and second base walls 106, 108 are rotated about the hinge 120 so that their interior faces 124, 126 are in an angled relationship with each other and the side walls 128, 130 no longer meet to form a continuous surface. The separation between the base walls 106, 108 and the side walls 128, 130 provides an opening through which the battery connector 80 can be received into the cavity 104. In the illustrated embodiment, the first base wall 106 and the second base wall 108 are rotated more than 90 degrees from the closed position so that no portion of the second base wall 108 (or the side wall 130 extending therefrom) is in alignment with the first base wall 106. In other embodiments, however, access to a cavity may be provided for a head of a battery connector with differently movable portions.

Referring now to FIG. 1, the locking mechanism 110 is externally disposed on a locking side 160 of the enclosure body 102. In the form illustrated, the locking mechanism 110 includes tabs 162, 164 formed on the side walls 128, 130 and which extend in a direction generally perpendicular the respective one of the first base wall 106 and second base wall to which it is attached. A plurality of apertures 166 are formed through each of the tabs 162, 164 with each aperture 166 being selectively alignable with one of the apertures 166 formed in the other one of the tabs 162, 164. When the first and second base walls 106, 108 are in the closed position, the tabs 162, 164, which are slightly offset from each other along the hinging axis, are configured to slide alongside each other such that the plurality of apertures 166 are in alignment. A lock device (not shown) can then be inserted into a set of aligned apertures 166 to hold the first base wall 106 and the second base wall 108 in the closed position via the tabs 162, 164.

In some embodiments, a locking mechanism may include tabs which are differently sized or positioned differently than those of the illustrated embodiments. Embodiments may also have more or less apertures than the illustrated embodiment, and at least one aperture may be formed through a part other than a tab. For example, a tab positioned on a side wall may include an aperture configured to be aligned with at least one of an aperture formed in a tab extending from the base wall or an aperture formed in the side wall itself.

A plurality of different lock devices may be used to engage the apertures of a battery lockout mechanism. In some examples, a set of aligned apertures could be engaged by a combination lock, a key-operated lock, a cable tie, a pin, or another type of lock device including a flexible or rigid section capable of extending into the apertures. In another embodiment, any other method of locking a battery connector lockout device can be used as an alternative to, or in combination with, the illustrated locking mechanism.

The lockout device 100 further includes a peg 112 projecting outwardly from the interior face 124 of the first base wall 106. The peg 112 is positioned proximate a side of the enclosure body 102 opposite the wire-receiving side 146 and extends into the cavity 104 in a direction substantially parallel to the side wall 128 and/or substantially perpendicular to the first base wall 106. A receiving slot 172 is formed on the second base wall 130 and is configured to receive an end 174 of the peg while the first and second base walls 106, 108 are in the closed position. The receiving slot 172 includes a slot wall 176 projecting into the cavity 104 from the interior face 126 of the second base wall 108. The slot wall 176 defines central opening 178 which extends from the end 182 of the slot wall 176 back to the second base wall 108. The profile of the receiving slot 172 is elongated from the attachment side 122 to the locking side 160 of the enclosure body 102 in order to receive the peg 112 as the base walls 106, 108 are rotated into the closed position.

In some embodiments, a peg and a corresponding receiving slot can be positioned in alternative positions. For example, a peg and receiving slot may be positioned closer to the attachment side or the locking side of the enclosure body, or they may be positioned further from or closer to the wire-receiving side of the enclosure body (see, e.g., FIGS. 4-6). At least one of the peg or the receiving slot may also extend from the other one of the first and second base walls, or from another portion of the enclosure body, such as a side wall. Further still, at least one of the peg or the receiving slot may extend from the respective base wall (or any other component to which it is attached) at an angle that is greater than or less than 90 degrees.

Further still, some embodiments may exclude at least one of the peg or the receiving slot. In some examples, a peg may extend to an end proximate or to the opposite base wall without being received in a receiving slot so as to still provide a positioning function for the connector head 82. The shape of a receiving slot can also be different in some embodiments. For example, a receiving slot may be circular, rectangular, or any other shape in any orientation. Some lockout mechanism can also include a receiving slot cut into a base wall rather than extending outwardly therefrom. At least one of the axial end of the peg or the end of the receiving slot may also be different than in the illustrated embodiment. For example the end of a receiving slot may be slanted with one side being shorter than the other to receive the peg as the first base walls move to the closed position. A peg can be configured to engage the opposite base wall and may include locking features to prevent detachment therefrom.

Having described the structural details of embodiments of a battery connector lockout device, details of a method for using the lockout device to lockout a battery connector can now be described with reference to FIGS. 1-3. Once the first and second base walls 106, 108 are in the open position, the connector head 82 can be inserted into the cavity 104 between the base walls 106, 108 as illustrated. As the connector head 82 is inserted, the peg 112 is configured to slide into and engage the attachment opening 84 on the connector head 82. While received on the peg 112, movement of the battery connector 80 is restricted except in the axial direction. After the connector head 82 is fully received on the peg 112 and is resting on the first base wall 106, the enclosure body 102 can be sealed by rotating the first and second base walls 106, 108 into the closed position.

When in the closed position, the second base wall 108 restricts axial movement of the connector head 82 along the peg 112, preventing its complete removal from the peg 112. When the connector head 82 is larger than the wire access opening, the partial side wall segments 148, 150 of the side walls 128, 130 may also be configured to abut the connector head 82, thereby restricting its passage through the wire access opening in the event the peg 112 fractures. However, for battery connectors types which have a connector head that is the same size as the wire (or simply smaller than the wire access opening), engagement between the attachment opening 84 and the peg 112 prevents the removal of the battery connector through the openings 140, 142. The receiving slot 172, which receives the end 174 of the peg 112, provides additional support to the peg 112 to help prevent bending or deformation thereof.

A lock device (e.g., a padlock, not shown) can then be used to engage at least one of the two sets of alignable apertures 166 to hold the first and second base walls 106, 108 in the closed position, thereby locking out the battery connector.

Figure 4:
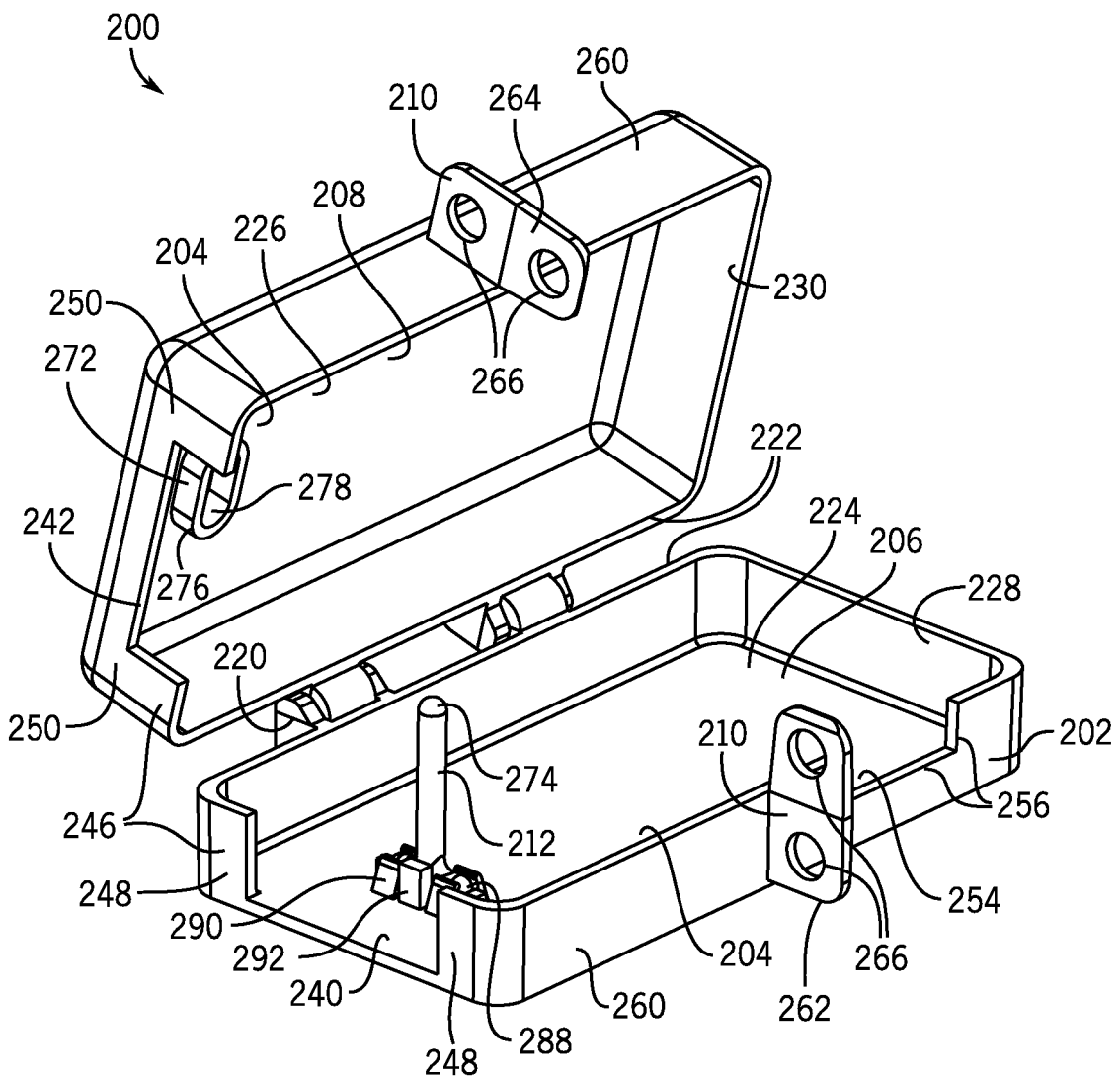
FIG. 4 is a perspective view of a battery connector lockout device according to a second embodiment in an open position with a folding peg in the extended upright position without a connector received therein.
Figure 5:
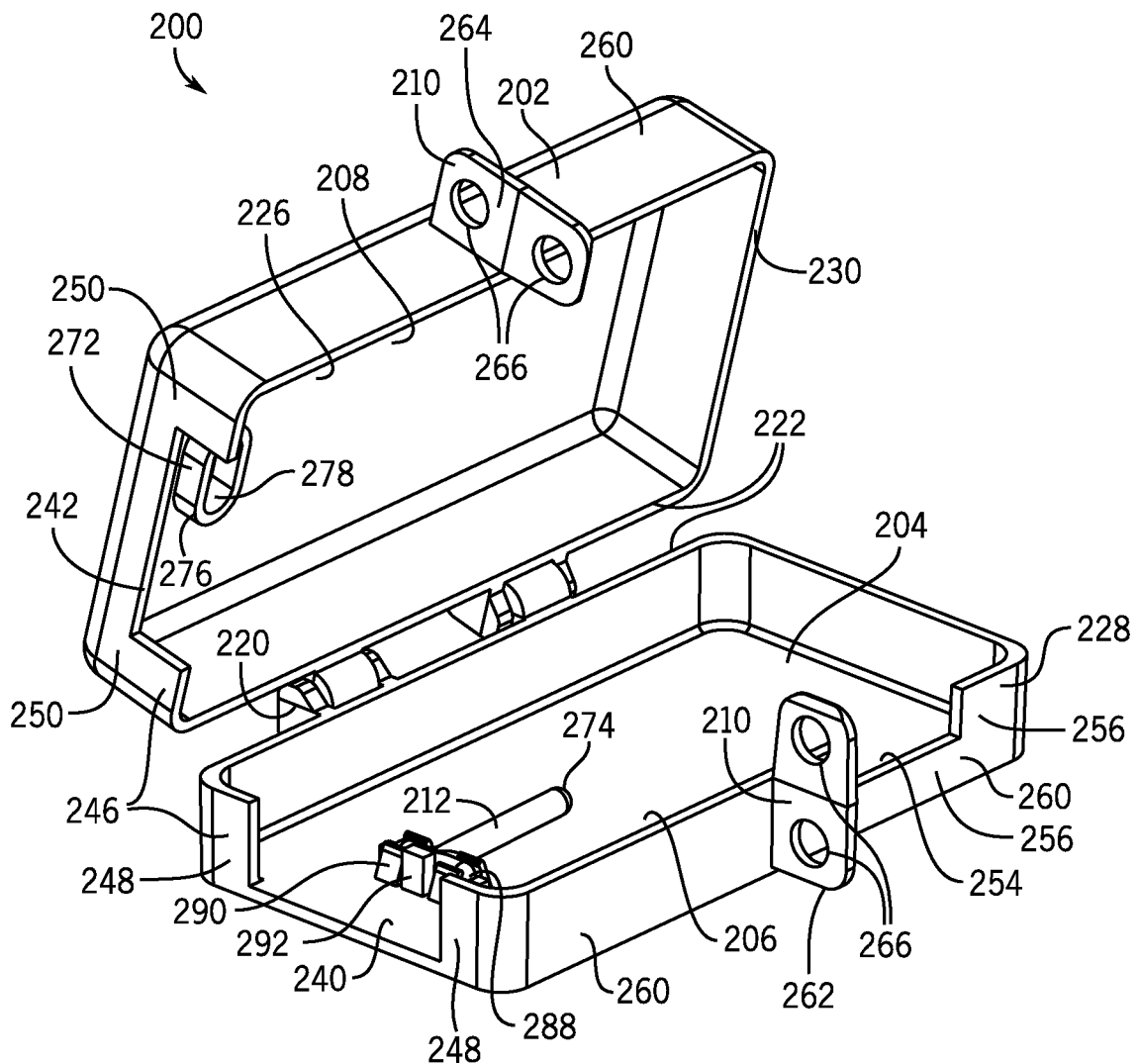
FIG. 5 is a perspective view of the battery connector lockout device of FIG. 4 with the folding peg in the folded down position without a connector received therein.
Figure 6:
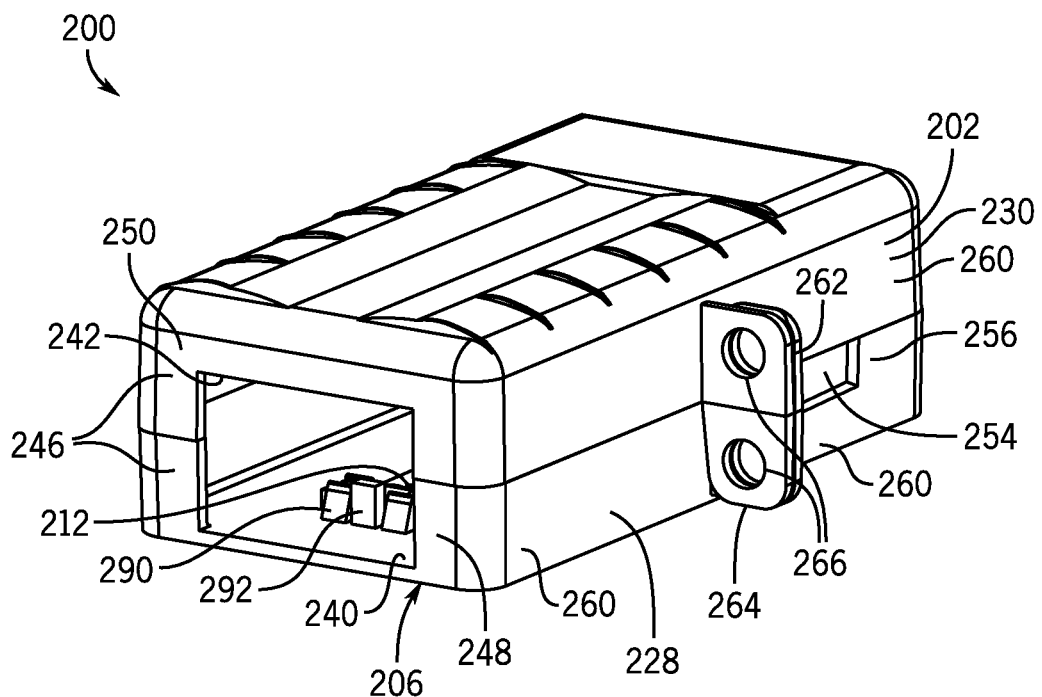
FIG. 6 is a perspective view of the battery connector lockout device of FIG. 4 in a closed position.

Turning now to FIGS. 4-6, a second embodiment of a battery connector lockout device 200 with a folding peg 212 is illustrated. In these Figures, elements that are similar to those of other embodiments of the present disclosure are represented by reference numerals in the 200's (e.g., peg 112 referred to as peg 212). Such elements should be regarded as having the same function and features unless otherwise stated or depicted herein, and the discussion of such elements may therefore not be repeated for multiple embodiments. For example, as previously described herein, the first base wall 206 and the second base wall 208 are selectively movable relative to each other between an open position (see, e.g., FIG. 4) and a closed position (see, e.g., FIG. 6). FIG. 4 illustrates the battery connector lockout device 200 in the open position without a connector inside and with the folding peg 212 in an extended position, FIG. 5 illustrates the battery connector lockout device 200 in the open position without a connector inside and with the folding peg 212 in a folded position, and FIG. 6 shows the battery connector lockout device 200 in the closed position.

The folding peg 212 includes a pivotable or folding shaft 288 rotatably received by a peg hinge 290 formed on the interior face 224 of the first base wall 206 proximate the opening 240. The peg hinge 290 allows the folding peg 212 to selectively rotate between the extended position and the folded position. In the extended position, as illustrated in FIG. 4, the folding peg 212 projects vertically into the cavity 204 so that it can engage the attachment opening of a battery connector or be inserted between two or more wires emanating from a connector head such that the peg 212 straddles the wires and prevents the connector from being removed from the closed enclosure. In the folded position, as illustrated in FIG. 5, the folding peg 212 lies flat and extends horizontally along the interior face 224 of the first base wall 206. The folding peg 212 can be selectively folded to adjust to a particular battery connector to be locked out (e.g., larger-sized connectors where the peg may not be necessary or properly positioned to lockout the connector). This enables embodiments of the battery connector lockout device to be used with connector heads having openings which are not compatible with a particular lockout device's peg position, a connector head without any openings, or smaller connectors with multiple wires extending from the connector head.

With continued reference to FIGS. 4-6, a rotational stop 292 is positioned proximate the peg hinge 290 is configured to restrict rotation of the folding peg 212, thereby preventing rotation past the extended position. In some embodiments, however, a rotational stop can be omitted to permit a wider range of movement of a folding peg. In some examples, a folding peg may be capable of 180 degrees of rotation to lie flat on the base wall on multiple sides of the peg hinge. In other embodiments, the range of motion of the folding peg may be limited to more or less than 180 degrees.

The second embodiment also shows, the locking side of enclosure body 202 further including a secondary wire access opening 254 configured to permit the lockout device 200 to receive a battery connector with a different connector head configuration than the battery connector received in the first wire access opening formed from openings 240 and 242. In the illustrated embodiment, the wire access opening 254 only extends through the side wall 228 attached to the first base wall 206 and does not include a corresponding opening in the opposite side wall 230. However, as previously discussed, other configurations are possible (e.g., openings formed in both halves and so forth). As illustrated, the overall width of the wire access opening 254 is less than the total length of the locking side 260, leaving partial side wall segments 256 adjacent to the opening 254. As previously described herein, depending on the size of the connector head, these partial side wall segments 256 may also help to prevent withdrawal of the connector head from the lockout device 200 when the lockout device 200 is in the closed position.

Figure 7:
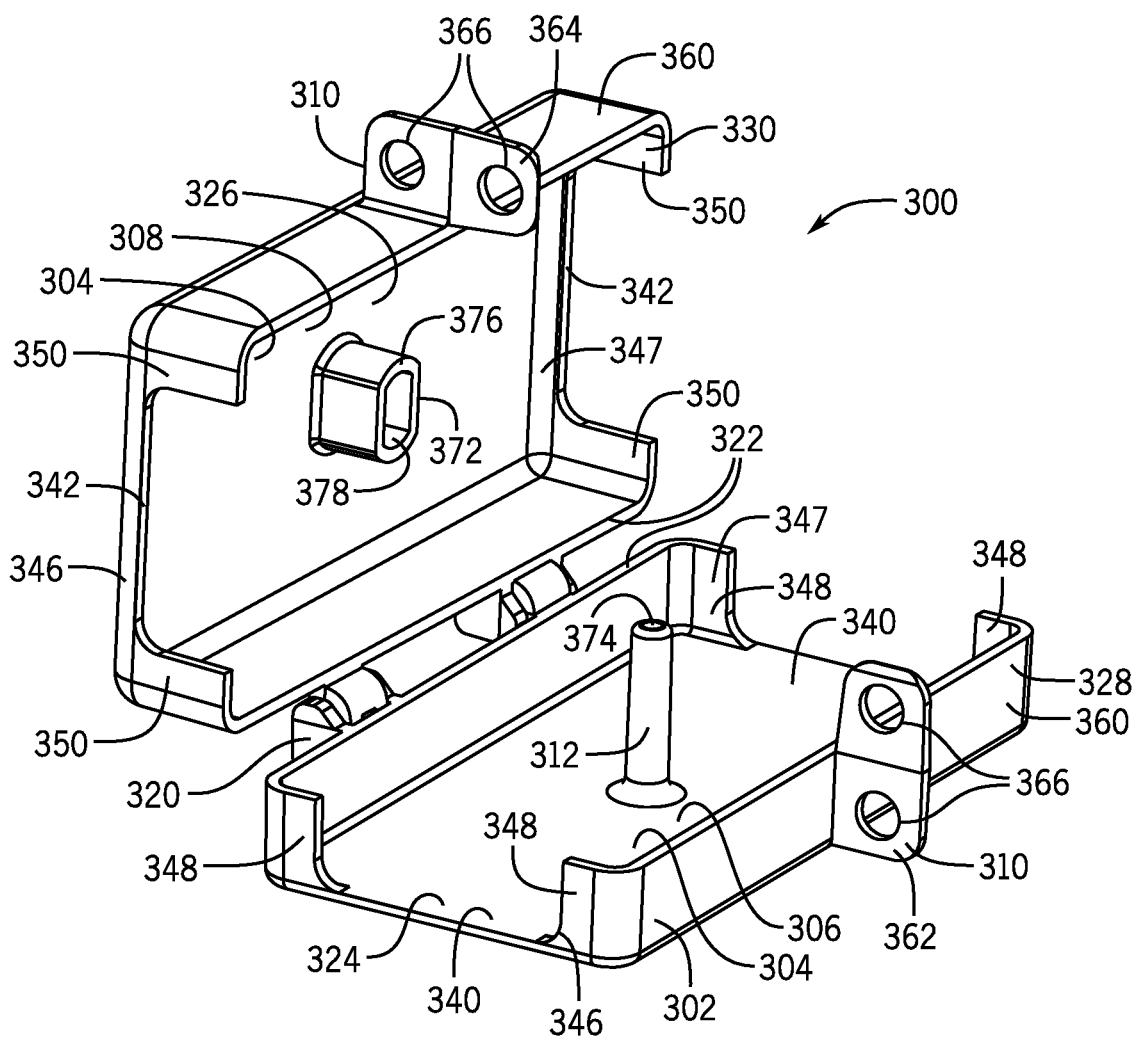
FIG. 7 is a perspective view of a battery connector lockout device according to a third embodiment in which the battery connector lockout device is in an open position.
Figure 8:
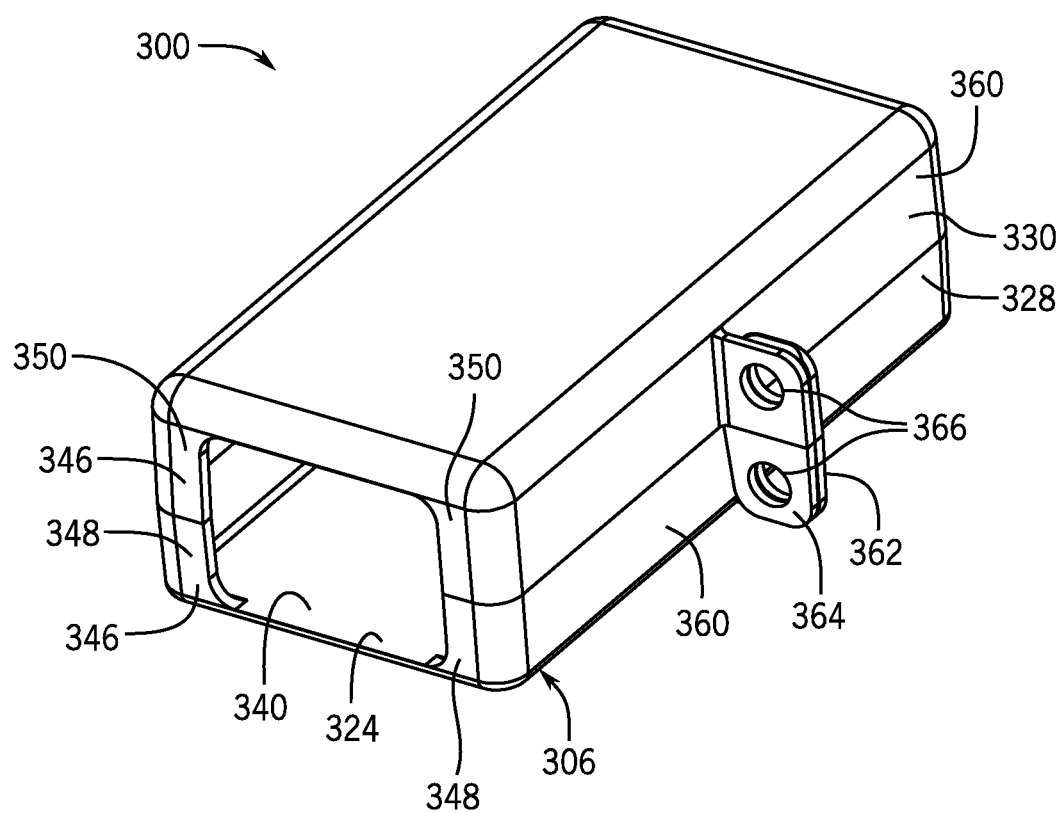
FIG. 8 is a perspective view of the battery connector lockout device of FIG. 7 in a closed position.

Turning now to FIGS. 7-8, a third embodiment of a battery connector lockout device 300 with a peg 312 centrally positioned within the cavity 304 is illustrated. In these Figures, elements that are similar to those of other embodiments of the present disclosure are represented by reference numerals in the 300's (e.g., peg 112 referred to as peg 312). Such elements should be regarded as having the same function and features unless otherwise stated or depicted herein, and the discussion of such elements may therefore not be repeated for multiple embodiments. For example, as previously described herein, the first base wall 306 and the second base wall 308 are selectively movable relative to each other between an open position (see, e.g., FIG. 7) and a closed position (see, e.g., FIG. 8). FIG. 7 illustrates the battery connector lockout device 300 in the open position without a connector inside and FIG. 8 illustrates the battery connector lockout device 300 in the closed position.

As illustrated, the peg 312 that projects from the first base wall 306 is centrally positioned within the cavity 304 between two wire-receiving sides 346, 347. Notably, a first wire-receiving side 346 and a second wire-receiving side 347 opposite the first wire-receiving side 346. Openings 340, 342 are formed through corresponding sections of the side walls 328, 330 to collectively form the wire access openings on the first wire-receiving side 346 and the second wire-receiving side 347 of the enclosure body 302.

Such a design as illustrated in FIGS. 7 and 8 can provide unique benefits beyond those presented in the first two embodiments. For example, the centrally positioned peg 312 may provide that the battery connector lockout device 300 be used ambidextrously (e.g., by a left-handed or right-handed user). In another non-limiting example, the first and second wire-receiving sides 346, 347 can allow for two terminals to be inserted in the battery connector lockout device 300 such that two battery connectors (not shown) can be received and secured on the peg 312 within the cavity 304. In yet another non-limiting example, the first and second wire-receiving sides 346, 347 can allow for a terminal with a connector head located along a continuous length of wire. For example, if the terminal end has wires connected at opposing ends thereof. The battery connector lockout device 300 may then receive the terminal end and then be placed in the closed position, effectively surrounding the terminal with opposing wires connected thereto.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A battery connector lockout device configured to lockout a battery connector, the battery connector including a connector head connected to a wire, the battery connector lockout device comprising:
   an enclosure body having a first base wall and a second base wall opposite the first base wall, the first base wall and the second base wall being selectively movable relative to each other between an open position and a closed position;
   a cavity defined by the enclosure body and dimensioned to receive the connector head;
   a wire access opening extending through the enclosure body into the cavity and dimensioned to permit extension of the wire from an exterior of the lockout device into the cavity while the first base wall and the second base wall are in the closed position;
   a peg projecting into the cavity from the enclosure body; and
   a locking mechanism configured to be selectively locked to hold the first base wall and the second base wall in the closed position, wherein the locking mechanism includes a plurality of apertures configured to be selectively alignable with one another to establish a set of aligned apertures and in which the set of aligned apertures are configured to be engaged by a lock through the set of aligned apertures to hold the first base wall and the second base wall in the closed position;
   wherein the battery connector lockout device is a lockout device in which the battery connector lockout device is to be received over the connector head and secured by a lock through the apertures to isolate and prevent the connector head from attachment to a connection point and further in which the lock is subsequently removable from the apertures to permit the aligned apertures to be brought out of alignment with one another to open the battery connector lockout device so the connector head is removable therefrom for attachment to the connection point.

2. The device of claim 1, wherein the head of the battery connector includes an attachment opening defined by the connector head and wherein the peg is configured to engage the attachment opening on the connector head.

3. The device of claim 1, wherein the battery connector includes two or more wires coming from the connector head and the peg is received between the two or more wires such that the two or more wires straddle the peg thereby restricting the connector head from being withdrawn from the wire access opening when the connector head is received in the cavity of the enclosure body and the first and second base walls are placed in the closed position.

4. The device of claim 1, wherein the peg projects outwardly from the first base wall.

5. The device of claim 4, further comprising a receiving slot positioned opposite the peg on the second base wall; and
   wherein the peg is configured to engage the receiving slot when the first base wall and the second base wall are in the closed position.

6. The device of claim 5, wherein the receiving slot projects outwardly from the second base wall into the cavity.

7. The device of claim 5, wherein the receiving slot has an elongated profile configured to receive the peg as the first base wall and the second base wall move from the open position to the closed position.

8. The device of claim 1, wherein the enclosure body includes a side wall extending from at least one of the first base wall and the second base wall and formed around the cavity to extend between the first base wall and the second base wall while in the closed position.

9. The device of claim 8, wherein the side wall includes a first wall section formed on the first base wall and a second wall section formed on the second base wall.

10. The device of claim 8, wherein the side wall includes the wire access opening dimensioned to permit extension of the wire from the exterior of the lockout device into the cavity while the first base wall and the second base wall are in the closed position.

11. The device of claim 10, wherein the wire access opening is dimensioned to restrict passage of the connector head out of the cavity through the wire access opening.

12. The device of claim 10, wherein the side wall includes at least one additional wire access opening formed through a different side of the enclosure body.

13. The device of claim 12, wherein two wire access openings are formed through opposing sides of the enclosure body.

14. The device of claim 13, wherein the peg is centrally positioned within the cavity between the two wire access openings.

15. The device of claim 1, wherein the peg is hingedly connected to the enclosure body such that the peg is selectively movable between an extended position in which the peg projects vertically outward into the cavity and a folded position in which the peg lies horizontally along the enclosure body.

16. The device of claim 1, wherein the first base wall is hingedly connected to the second base wall, and the first base wall and the second base wall rotate between the open position and the closed position.

17. The device of claim 1, wherein a first one of the plurality of apertures is integrally connected to the first base wall and a second one of the plurality of apertures is integrally connected to the second base wall.

18. The device of claim 1, wherein a tab extends from at least one of the first base wall or the second base wall, and at least one of the apertures is formed in the tab.

* * * * *